US012616857B2

(12) United States Patent
Johnson et al.

(10) Patent No.: US 12,616,857 B2
(45) Date of Patent: May 5, 2026

(54) VENTILATING AND FILTRATING FACE MASK

(71) Applicant: NIKE, Inc., Beaverton, OR (US)

(72) Inventors: Nick Johnson, Beaverton, OR (US); Dallas Lund, Beaverton, OR (US); Kyle Schepke, Portland, OR (US); Chau Yui Fung, Hong Kong (HK)

(73) Assignee: NIKE, Inc., Beaverton, OR (US)

( * ) Notice: Subject to any disclaimer, the term of this patent is extended or adjusted under 35 U.S.C. 154(b) by 677 days.

(21) Appl. No.: 17/591,290

(22) Filed: Feb. 2, 2022

(65) Prior Publication Data

US 2022/0305305 A1 Sep. 29, 2022

Related U.S. Application Data

(60) Provisional application No. 63/165,884, filed on Mar. 25, 2021.

(51) Int. Cl.

| | |
|---|---|
| ***A62B 23/02*** | (2006.01) |
| ***A41D 13/11*** | (2006.01) |
| ***A41H 43/04*** | (2006.01) |

(52) U.S. Cl.

CPC ........ *A62B 23/025* (2013.01); *A41D 13/1115* (2013.01); *A41D 13/1161* (2013.01); *A41H 43/04* (2013.01)

(58) Field of Classification Search

CPC ....... A62B 23/025; A62B 23/03; A41D 13/11; A41D 13/1192; A41D 13/1107; A41D 13/1184; A41D 13/1146; A41D 13/1115; A41D 13/1123; A41D 13/1138; A41H 43/04

See application file for complete search history.

(56) References Cited

U.S. PATENT DOCUMENTS

| | | | | |
|---|---|---|---|---|
| 4,248,220 A | | 2/1981 | White | |
| D273,145 S | | 3/1984 | Ponsi | |
| 4,635,628 A | * | 1/1987 | Hubbard | B32B 27/065 128/201.17 |
| 5,374,458 A | | 12/1994 | Burgio | |

(Continued)

FOREIGN PATENT DOCUMENTS

| | | |
|---|---|---|
| CN | 103442771 A | 12/2013 |
| CN | 103222695 B | 3/2016 |

(Continued)

OTHER PUBLICATIONS

Sports Mask Dust Face Mask Breathable Vents Designed for Running Cycling Mowing, ThePartsBiz,, Available online at: <https://www.thepartsbiz.com/>, Accessed on Sep. 20, 2020, 3 pages.

(Continued)

*Primary Examiner* — Kari K Rodriquez

(74) *Attorney, Agent, or Firm* — Shook, Hardy & Bacon L.L.P.

(57) ABSTRACT

Aspects herein are directed to a washable and reusable face mask that provides effective filtration of small-sized particulate matter while providing a large surface area for gas exchange. The face mask is formed from knit materials and polyurethane materials and includes a plurality of molded pleats that extend from a right side edge to a left side edge of the face mask.

13 Claims, 5 Drawing Sheets

(56) References Cited

U.S. PATENT DOCUMENTS

| | | | | |
|---|---|---|---|---|
| 6,474,336 | B1 * | 11/2002 | Wolfe | A41D 13/1115 128/206.19 |
| 7,086,401 | B2 | 8/2006 | Chiam | |
| 8,640,704 | B2 | 2/2014 | Spoo et al. | |
| 8,905,034 | B2 | 12/2014 | Goranov et al. | |
| D840,602 | S | 2/2019 | Kreitschmann | |
| D885,676 | S | 5/2020 | Yuan | |
| 10,799,728 | B2 | 10/2020 | Gordon | |
| 10,808,338 | B1 * | 10/2020 | Yidi | D03D 15/283 |
| 10,834,980 | B2 | 11/2020 | Magidson et al. | |
| D905,847 | S | 12/2020 | Orman | |
| 2006/0130841 | A1 | 6/2006 | Spence et al. | |
| 2009/0114228 | A1 * | 5/2009 | Kirschner | A01M 31/008 128/206.13 |
| 2012/0060843 | A1 * | 3/2012 | Magidson | A41D 13/1146 128/206.19 |
| 2014/0026897 | A1 | 1/2014 | Saroch et al. | |
| 2014/0182593 | A1 | 7/2014 | Duffy | |
| 2014/0332012 | A1 * | 11/2014 | Mekler | A62B 23/025 128/863 |
| 2015/0059773 | A1 | 3/2015 | Duffy | |
| 2015/0173436 | A1 | 6/2015 | Tsuei | |
| 2017/0252590 | A1 | 9/2017 | Angadjivand et al. | |
| 2017/0280817 | A1 * | 10/2017 | Hutchinson | A43B 23/26 |
| 2018/0250537 | A1 | 9/2018 | Waterford | |
| 2019/0143253 | A1 | 5/2019 | Lee et al. | |
| 2020/0009409 | A1 | 1/2020 | Crotty et al. | |
| 2020/0009410 | A1 * | 1/2020 | Gordon | A62B 18/025 |
| 2020/0390167 | A1 | 12/2020 | Duffy | |
| 2021/0299489 | A1 * | 9/2021 | Semerly | A61M 21/02 |
| 2021/0322801 | A1 * | 10/2021 | Smith, IV | B32B 5/022 |
| 2021/0353981 | A1 * | 11/2021 | Gray, III | A62B 18/084 |
| 2021/0362082 | A1 * | 11/2021 | Khedimi | A62B 18/025 |
| 2022/0145501 | A1 * | 5/2022 | Haratz | D04B 1/22 |
| 2024/0081438 | A1 * | 3/2024 | Motegi | D04H 3/16 |

FOREIGN PATENT DOCUMENTS

| | | | |
|---|---|---|---|
| CN | 107095374 | A | 8/2017 |
| CN | 207341254 | U | 5/2018 |
| CN | 112021690 | A | 12/2020 |
| DE | 202020101979 | U1 | 4/2020 |
| EP | 2799116 | A1 | 11/2014 |
| GB | 2059782 | B | 7/1983 |
| JP | 6966118 | B1 | 10/2021 |
| KR | 20-0395267 | Y1 | 9/2005 |
| WO | 2011/026515 | A1 | 3/2011 |
| WO | 2015/137739 | A1 | 9/2015 |
| WO | 2018/033108 | A1 | 2/2018 |
| WO | 2021/015554 | A1 | 1/2021 |

OTHER PUBLICATIONS

Sportsta™ Mask, Pollution Masks, Available online at: <https://respro.com/store/product/sportsta-mask>, Accessed on Nov. 9, 2013, 2 pages.

UA Sportsmask, Under Armour, Available online at: <https://www.underarmour.com/en-us/p/ua-sportsmask/1368010.html>, Accessed on Jul. 26, 2020, 10 pages.

Vent Filtration Breathing Trainer, Training Mask, Available online at: <https://www.trainingmask.com/>, Accessed on Apr. 21, 2020, 6 pages.

WiseGuise, The Face Mask Reinvented, Available online at: <https://wiseguise.la/>, Accessed on Jan. 12, 2021, 20 pages.

International Search Report and Written Opinion received for PCT Patent Application No. PCT/US2022/015235, mailed on May 3, 2022, 12 pages.

Office Action received for European Application No. 22707271.7, mailed on Oct. 15, 2025, 3 pages.

* cited by examiner

VENTILATING AND FILTRATING FACE MASK

CROSS-REFERENCE TO RELATED APPLICATIONS

This application titled, "Ventilating and Filtrating Face Mask," claims the benefit of priority of U.S. App. No. 63/165,884, filed Mar. 25, 2021, and titled "Ventilating and Filtrating Face Mask." The entirety of the aforementioned application is incorporated by reference herein.

TECHNICAL FIELD

Aspects herein relate to a washable, reusable, molded face mask adapted to provide a high degree of filtration of small-sized particulate matter while having a large surface area to facilitate gas exchange in, for example, exercise conditions.

BACKGROUND

Traditional filtration masks generally use nonwoven materials such as nonwoven polyester fibers, nonwovens with electrostatically charged polypropylene fibers, or nonwovens impregnated with activated charcoal or other additives. Although these materials may provide effective filtration, the materials are unable to withstand washing thus limiting the use-life of the filtration mask. Moreover, traditional filtration masks generally do not have a large surface area making them less than ideal for wear during exercise activity when large amounts of air exchange with the external environment is desired and needed.

SUMMARY

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are examples and are not limiting.

Clause 1. A ventilating face mask comprising: at least one knit layer; a filtration layer including one or more of a polyurethane (PU) material and a knit spacer material; and a plurality of molded pleats formed from the at least one knit layer and the filtration layer, the plurality of molded pleats extending continuously from a left side edge of the ventilating face mask to a right side edge of the ventilating face mask.

Clause 2. The ventilating face mask according to clause 1, wherein the at least one knit layer is a mesh knit layer.

Clause 3. The ventilating face mask according to any of clauses 1 through 2, wherein the PU material includes one of an open-cell PU foam or a thermoplastic polyurethane.

Clause 4. The ventilating face mask according to any of clauses 1 through 3, wherein the PU material is positioned between the at least one knit layer and the knit spacer material.

Clause 5. The ventilating face mask according to any of clauses 1 through 4, wherein the PU material is bonded to each of the at least one knit layer and the knit spacer material.

Clause 6. The ventilating face mask according to any of clauses 1 through 5, further comprising an attachment mechanism adapted to secure the ventilating face mask to a face of a wearer.

Clause 7. The ventilating face mask according to any of clauses 1 through 6, wherein the filtration layer does not include a nonwoven material.

Clause 8. A ventilating face mask comprising: a first laminate construction including a first polyurethane (PU) layer positioned between a first knit layer and a second knit layer, the first knit layer forming an outermost-facing surface of the ventilating face mask; a second laminate construction including a second PU layer positioned between a third knit layer and a fourth knit layer, the third knit layer adjacent to the second knit layer, at least a portion of the fourth knit layer forming an innermost-facing surface of the ventilating face mask; and a plurality of molded pleats formed from the first laminate construction and the second laminate construction, the plurality of molded pleats extending continuously from a left side edge to a right side edge of the ventilating face mask.

Clause 9. The ventilating face mask according to clause 8, wherein the third knit layer is substantially unaffixed from the second knit layer.

Clause 10. The ventilating face mask according to any of clauses 8 through 9, wherein the first knit layer and the fourth knit layer are mesh knit layers.

Clause 11. The ventilating face mask according to any of clauses 8 through 10, wherein the second knit layer and the third knit layer are spacer knit layers.

Clause 12. The ventilating face mask according to any of clauses 8 through 11, wherein the first PU layer and the second PU layer include one of an open-cell PU foam or a thermoplastic polyurethane.

Clause 13. The ventilating face mask according to any of clauses 8 through 12, further comprising an attachment mechanism adapted to secure the ventilating face mask to a face of a wearer.

Clause 14. The ventilating face mask according to any of clauses 8 through 13, wherein the third knit layer and the second PU layer are absent from one or more areas of the ventilating face mask.

Clause 15. A method of manufacturing a ventilating face mask comprising: molding a first laminate construction including a first polyurethane (PU) layer positioned between a first knit layer and a second knit layer to form a first plurality of molded pleats; and forming the ventilating face mask using the first laminate construction, wherein the first plurality of molded pleats extends continuously from a left side edge of the ventilating face mask to a right side edge of the ventilating face mask.

Clause 16. The method of manufacturing the ventilating face mask according to clause 15, further comprising: molding a second laminate construction including a second PU layer positioned between a third knit layer and a fourth knit layer to form a second plurality of molded pleats; and joining the first laminate construction and the second laminate construction such that the third knit layer is adjacent to the second knit layer and the second plurality of molded pleats are in registration with the first plurality of molded pleats, wherein the first knit layer forms an outermost-facing surface of the ventilating face mask and the fourth knit layer forms an innermost-facing surface of the ventilating face mask.

Clause 17. The method of manufacturing the ventilating face mask according to clause 16, wherein joining the first laminate construction and the second laminate construction includes affixing together a perimeter edge of the first laminate construction and a perimeter edge of the second laminate construction.

Clause 18. The method of manufacturing the ventilating face mask according to any of clauses 16 through 17, further comprising: removing a portion of the second PU layer and the third knit layer at a first area of the ventilating face mask corresponding to an area above a nostril area of a wearer; and removing a portion of the second PU layer and the third knit layer at a second area of the ventilating face mask corresponding to a chin area of the wearer.

Clause 19. The method of manufacturing the ventilating face mask according to any of clauses 15 through 18, further comprising affixing an attachment mechanism to the ventilating face mask, wherein the attachment mechanism is adapted to secure the ventilating face mask to a face of a wearer.

Clause 20. The method manufacturing the ventilating face mask according to any of clauses 15 through 19, wherein the ventilating face mask does not include a nonwoven material.

BRIEF DESCRIPTION OF THE DRAWINGS

Examples of aspects herein are described in detail below with reference to the attached drawing figures, wherein.

DETAILED DESCRIPTION

Figure 1:
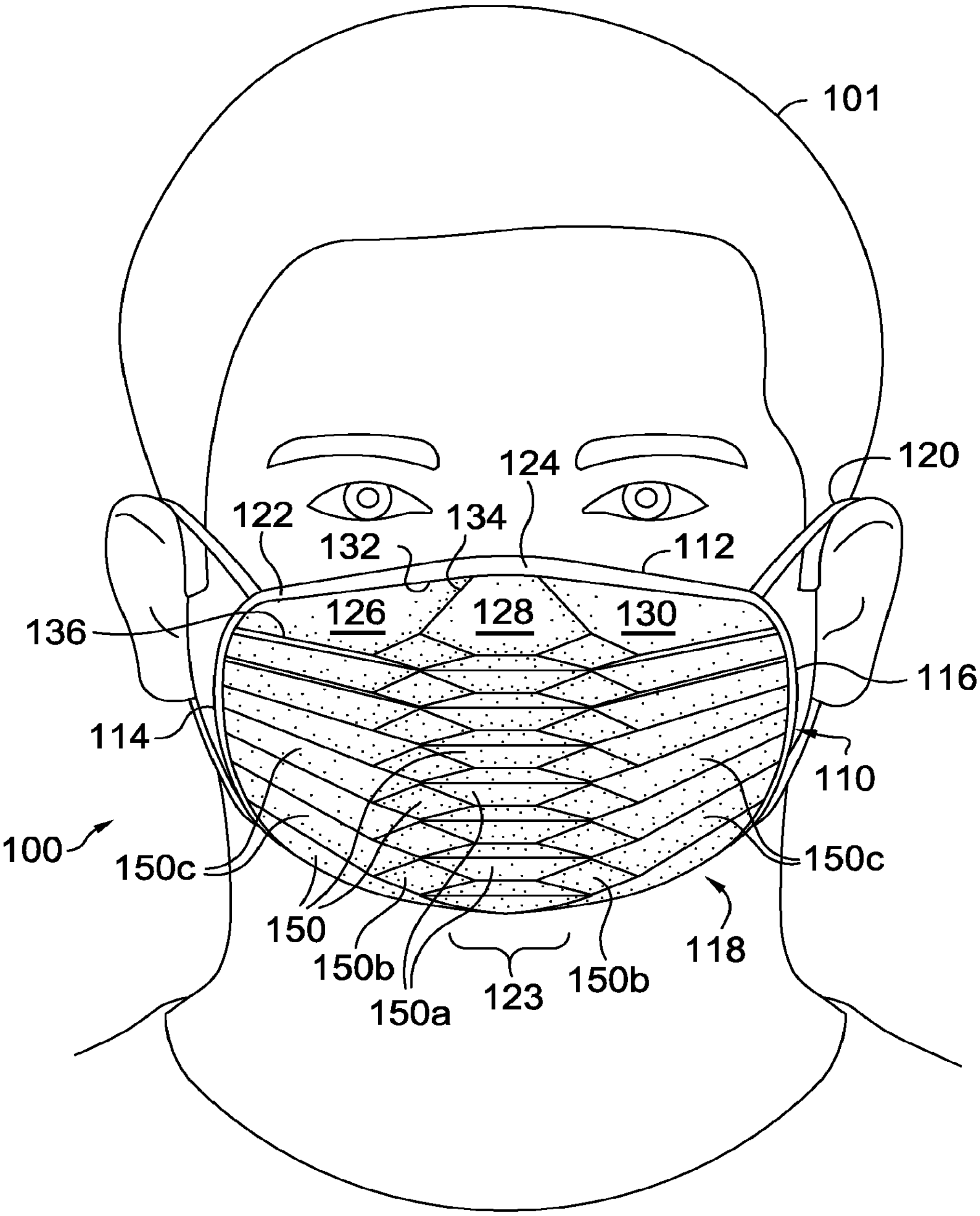
FIG. 1 illustrates a front view of an example ventilating and filtrating face mask being worn by a wearer in accordance with aspects herein.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Traditional filtration masks generally use nonwoven materials such as nonwoven polyester fibers, nonwovens formed from electrostatically charged polypropylene fibers, or nonwovens impregnated with activated charcoal or other additives. Although these materials may provide effective filtration, the materials are unable to withstand washing thus limiting the use-life of the filtration mask to a couple of uses. For example, the nonwoven materials may lose their structural integrity during wash which impacts filtration or, if the nonwoven is electrostatically charged, the charge may dissipate during washing. Moreover, traditional filtration masks generally do not have a large surface area relative to their size making them less than ideal for wear during exercise activity when large amounts of air exchange with the external environment is desired and needed.

Aspects herein are directed to a washable and reusable face mask that provides effective filtration of small-sized particles (e.g., 2.5 microns or less) while providing a large surface area to facilitate air exchange with the external environment making the face mask ideal for use when exercising, including exercising in high-pollution areas and/or in areas where risk of infection with airborne particles is high. To make the face mask washable, knit materials and polyurethane (PU) materials are used including, for example PU foams. This is in contrast to typical filtration masks that utilize nonwoven materials which are generally not washable. The knit materials and the PU materials are layered to provide the desired level of filtration and to give the face mask its needed structure. For example, the knit materials may include a spacer knit material that, alone or in combination with, for example, the PU foam, effectively filters particles including particles that are 2.5 microns or less.

The large surface area of the face mask is created through a plurality of molded pleats that generally extend from a right side edge to a left side edge of the face mask. The use of the knit materials, including spacer knit materials, and the PU materials enable the pleats to be molded. Because the pleats are molded using the materials described, the pleats are able to withstand washing without deforming further prolonging the useful life of the face mask up to, for instance, 25 washes, 50 washes, or even more. The face mask may be molded in such a way that an area of the face mask overlying the wearer's nose and mouth may be set off from these structures. This helps to prevent the face mask from collapsing against the wearer's mouth and nose during, for example, inhalation including forceful inhalation.

To facilitate vertical movement of the wearer's mouth, chin, and nose during talking and/or breathing, the molded pleats may be oriented such that the long axes of the respective pleats are oriented horizontally (i.e., in a direction extending between the right side edge and the left side edge of the face mask). Thus, the pleats can expand and contract in a vertical direction to accommodate the vertical movement of the wearer's mouth, chin, and nose during talking and breathing. To further facilitate vertical movement of the wearer's mouth, chin, and nose during talking and/or breathing, including forceful breathing, one or more of the layers of the face mask may optionally be removed in a location corresponding to above the wearer's nostrils (e.g., at the dorsum of the wearer's nose) and in a location corresponding to the wearer's chin. Since portions of the nose and chin areas of the wearer may be in contact with the inner surface of the face mask, the decreased amount of material layers in these locations facilitates facial movement without causing significant shifting of the face mask. The face mask may include additional features for comfort including a nose bridge, a gasket around the perimeter edge of the face mask to provide a tight seal against the wearer's face, and an adjustment mechanism used to adjustably secure the face mask on the face of the wearer. Moreover, since the face mask is reusable, a carrying case may be provided to transport the face mask when not in use.

As used herein, the term "face mask" means a structure that is configured to fully cover at least a wearer's nose and mouth such that any inhalation and/or exhalation from the wearer's mouth and nose passes through the material layers of the face mask. Positional terms used when describing the face mask such as "upper," "lower," "anterior," "right side edge," "left side edge," "innermost-facing surface," "outermost-facing surface," and the like are with respect to the face mask being worn by a wearer as intended with the wearer standing upright. Thus, the upper part of the face mask with the nose bridge would be located closer to the top of a wearer's head, and the lower part of the face mask would be located closer to the wearer's neck. The right side edge of the face mask would be located adjacent to the right side of the wearer's face, and the left side edge would be located adjacent to the left side of the wearer's face. The innermost-facing surface of the face mask would be the layer that is closest to the wearer's skin surface with respect to the other layers forming the face mask, and the outermost-facing surface of the face mask would be the layer that is closest to the external environment with respect to the other layers forming the face mask. The relative terms "outer" or "anterior" and "inner" when describing different structures of the face mask are used in relation to a wearer's face. Thus, for example, an outer or outermost edge of a structure would be located further away from the wearer's face in an anterior direction with respect to other edges of the structure.

The term "knit layer" means a textile produced through a knitting process including a weft knitting process or a warp knitting process. In generally, the knit layer includes interlooped yarns and may include one or more different knit stitch types (tuck stitches, float stitches, basic knit stitches, transfer stitches, missed stitches, and the like). This is in contrast with a nonwoven textile, which refers to fibers that are held together by mechanical and/or chemical interactions without being in the form of a knit, woven, braided construction, or other structured construction. In aspects, the nonwoven textile includes a collection of fibers that are mechanically or chemically manipulated to form a mat-like material. Stated differently nonwoven textiles are directly made from fibers.

The term "knit spacer material," as used herein is meant to encompass both warp knit and weft knit spacer textiles as is known in the art of textiles. Knit spacer materials are generally formed by utilizing at least one tie yarn to interknit first and second knit layers of the textile. More specifically, each of the first layer and the second layer may be knit separately, and the tie yarn(s) is used to connect the first layer and the second layer. For instance, the tie yarns may have "loop" portions that extend into each of the first layer and the second layer where the loop portions are interlooped with yarns in the first layer and the second layer to connect the two layers. The tie yarns are generally oriented orthogonal to the first and second layers. The distance between the first layer and the second layer may be varied by, for instance, varying the length of the tie yarn that extends between the first layer and the second layer. The term "mesh knit layer" refers to a knit layer that includes a plurality of integrally knit holes created through, for example, dropping stitches, transferring stitches, and the like. The term "laminate construction" as used herein refers to a construction in which the surfaces of different layers of materials are secured to each other. The securement may be through an adhesive, melting and fusing yarns in the different layers, melting or softening material layers, heat bonding, point bonding, ultrasonic bonding, and the like.

The term "effective filtration" as used herein means the ability to filter at least about 90% of particles having a size of 2.5 microns or less.

Unless indicated otherwise, all measurements provided herein are taken when the face mask is at standard ambient temperature and pressure (298.15 K and 100 kPa) and the face mask is in a resting state (e.g., an unstretched state).

Figure 2:
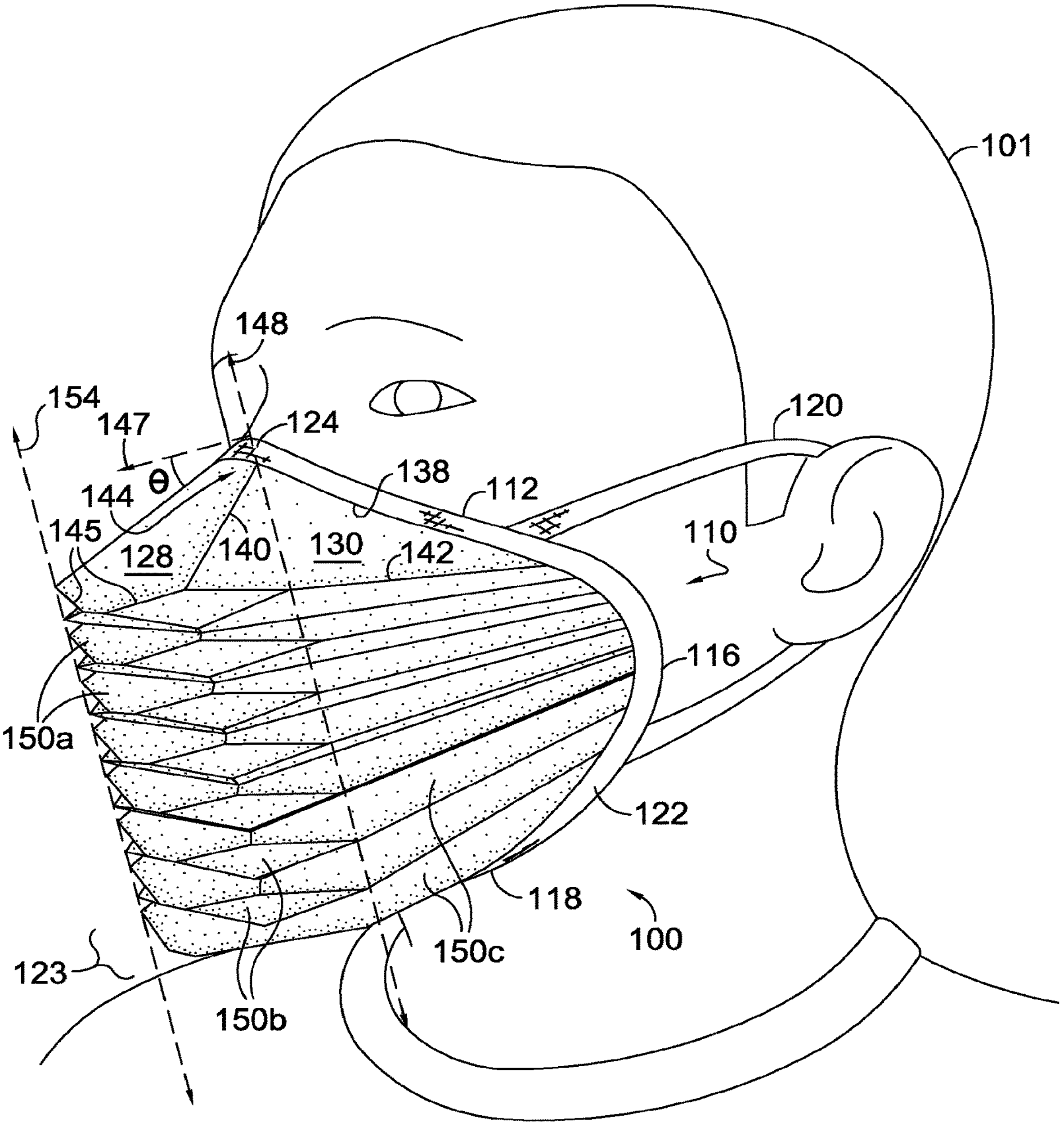
FIG. 2 illustrates a side perspective view of the ventilating and filtrating face mask of FIG. 1 in accordance with aspects herein.

FIG. 1 depicts a front view of a ventilating and filtrating face mask 100 being worn on the face of a wearer 101, and FIG. 2 depicts a front perspective view of the face mask 100. With respect to both FIGS. 1 and 2, the face mask 100 includes a continuous edge 110 that defines a perimeter shape of the face mask 100. For example, the continuous edge 110 of the face mask 100 includes an upper edge 112 that extends along a portion of the wearer's right cheekbone, the bridge of the wearer's nose, and along a portion of the wearer's left cheekbone when the face mask 100 is worn. The continuous edge 110 includes a right side edge 114 that extends along a portion of the wearer's right cheek and a left side edge 116 that extends along a portion of the wearer's left cheek. The continuous edge 110 further includes a lower edge 118 that extends below a portion of the wearer's right jaw, under the wearer's chin, and under a portion of the wearer's left jaw.

The face mask 100 may include an attachment mechanism 120 configured to secure the face mask 100 to the wearer's face. The attachment mechanism 120 may include a number of different configurations in example aspects. For example, as shown, the attachment mechanism 120 may include loops that extend behind the wearer's ears, a band that extends behind the wearer's head, two bands that extend behind the wearer's head and/or neck, and the like. The face mask 100 may include additional features such as a gasket 122 secured to the continuous edge 110 of the face mask 100. The gasket 122 may be formed of a textile material, a rubber material, a silicone material, a flocked material, and the like and is configured to form a relatively tight seal between the face mask 100 and the wearer's face. The face mask 100 may also include a conformable nose bridge 124 that can be used to secure and conform the upper edge 112 of the face mask 100 to the bridge of the wearer's nose. Example materials used to form the nose bridge 124 include metal, a foam material including a memory foam material, a moldable plastic or rubber strip, and the like.

The face mask 100 has an overall molded shape that results in at least a mid-region 123 of the face mask 100 being set off or spaced apart from the wearer's nose and mouth where the mid-region 123 is the area of the face mask 100 generally located between the smaller-sized pleats 150*b* as explained below and extends across the vertical center of the face mask 100. The overall shape of the face mask 100 is achieved through a molding process which molds and/or heat sets the materials used to form the face mask 100 such that the shape is maintained during and after wash (i.e., the face mask 100 resists deformation and has structural stability). This prevents the mid-region 123 of the face mask 100 from collapsing against the wearer's nose and mouth during inhalation, including forceful inhalation.

To facilitate at least the mid-region 123 of the face mask 100 being spaced apart from the wearer's nose and mouth, the face mask 100 may include a right planar portion 126, a middle planar portion 128, and a left planar portion 130 where the middle planar portion 128 is positioned between the right planar portion 126 and the left planar portion 130. Each of the right planar portion 126, the middle planar portion 128, and the left planar portion 130 does not include pleats. The right planar portion 126, the middle planar portion 128, and the left planar portion 130 each has a generally triangle-like shape and shares at least one common edge with each other. For instance, the right planar portion includes edge 132 that forms a portion of the upper edge 112, edge 134 that is a common edge with the middle planar portion 128, and edge 136 that forms an outer edge of the triangle-like shape and is spaced apart from the upper edge 112 in an anterior direction. As shown in FIG. 2, the left planar portion 130 includes edge 138 that forms a portion of the upper edge 112, edge 140 that is a common edge with the middle planar portion 128, and edge 142 that forms an outer edge of the triangle-like shape and is spaced apart from the upper edge 112 in the anterior direction. The middle planar portion 128 includes the edges 134 and 140 that meet at an apex area 144 positioned at the upper edge 112 of the face mask. The middle planar portion 128 also includes edge 145 that forms an outer edge of the triangle-like shape and is located opposite the apex area 144 in the anterior direction. Each of the right planar portion 126, the middle planar portion 128, and the left planar portion 130 extend anteriorly with respect to the upper edge 112 (i.e., away from the wearer's face when the mask is worn). In example aspects, at least the middle planar portion 128 may extend at an angle, θ, from about 30 degrees to about 60 degrees from a line 147 drawn perpendicular to an axis 148 that extends vertically downward from the apex area 144 of the triangle-like shape forming the middle planar portion 128. In example aspects, the axis 148 intersects the lower edge 118 of the face mask 100 under the wearer's chin. The edge 145 that forms the outer edge of the triangle-like shape forming the middle planar portion 128 may be offset anteriorly from about 2 cm to about 15 cm from the upper edge 112 of the face mask 100. The structure thus described creates a space between the wearer's nose and mouth and an inner-facing surface of the face mask 100 where the space is maintained due to the molded nature of the face mask 100.

The face mask 100 includes a plurality of molded folds or pleats referenced generally by the numeral 150. The pleats 150 generally extend continuously between the right side edge 114 and the left side edge 116. In example aspects, an uppermost set of the pleats 150 share a common edge with the edges 136, 142, and 145 of the right planar portion 126, the middle planar portion 128, and the left planar portion 130 respectively. In example aspects, the pleats 150 can include multiple mountain-valley folds, folded along multiple different axes, and can be arranged in one or more origami-type folding patterns. In one example aspect, and as shown, the pleats 150 of the mid-region 123 (indicated by numeral 150*a* in FIG. 2) may be folded to produce a pleat structure having a diamond shape with the long axis of the shape oriented horizontally on the face mask 100 (i.e., perpendicular to the axis 148). In this aspect, it is contemplated herein that the mid-region 123 of the face mask 100 may include from about four vertically stacked diamond-shaped pleats 150*a* to about ten vertically stacked diamond-shaped pleats 150*a*, from about five vertically stacked diamond-shaped pleats 150*a* to about nine vertically stacked diamond-shaped pleats 150*a*, or about six vertically stacked diamond-shaped pleats 150*a* to about eight vertically stacked diamond-shaped pleats 150*a*. Configuring the pleats 150*a* such that the long axis of the pleats 150*a* is oriented horizontally in the mid-region 123 facilitates the pleats 150*a* expanding and contracting in a vertical direction in response to stretching or tensioning forces such as, for example, when the wearer opens and closes their mouth. Other shapes are contemplated herein where the shapes may include a long axis that is horizontally oriented on the face mask 100.

Moreover, different pleat sizes may be used including smaller-sized pleats such as the pleats 150*b*. In example aspects, the smaller-sized pleats 150*b* may be positioned at the lateral edges of the mid-region 123 where they facilitate a change in direction of the face mask 100 such that it "folds around" the sides of the wearer's face. The long axes of pleats located at the right and left sides of the face mask 100, such as pleats 150*c* may converge toward each other at the right side edge 114 and the left side edge 116.

In example aspects, the outermost or anterior-most edges of the pleats 150*a* in the mid-region 123 may abut an axis 154 that is substantially parallel (within from about 20 degrees to about 30 degrees of parallel) to the axis 148 thus ensuring that the mid-region 123 of the face mask 100 maintains a generally set distance from the wearer's nose and mouth from the uppermost pleat 150*a* to the lowermost pleat 150*a*. Forming the face mask 100 to include multiple pleats 150*a*, 150*b*, and 150*c* as described increases the surface area of the face mask 100. For instance, the surface area of the face mask 100 may be increased two to three times compared to if the face mask 100 did not include the pleats 150*a*, 150*b* and 150*c* thus facilitating a greater amount of air exchange which may be beneficial in exercise conditions.

The depiction of the pleats 150*a*, 150*b*, and 150*c* in FIGS. 1 and 2 is illustrative only, and it is contemplated herein that other pleat arrangements could be used. For example, the pleats 150*a*, 150*b*, and 150*c* may be positioned at different locations than that shown. As well, other types of pleat structures may be used in accordance with aspects herein.

Figure 3:
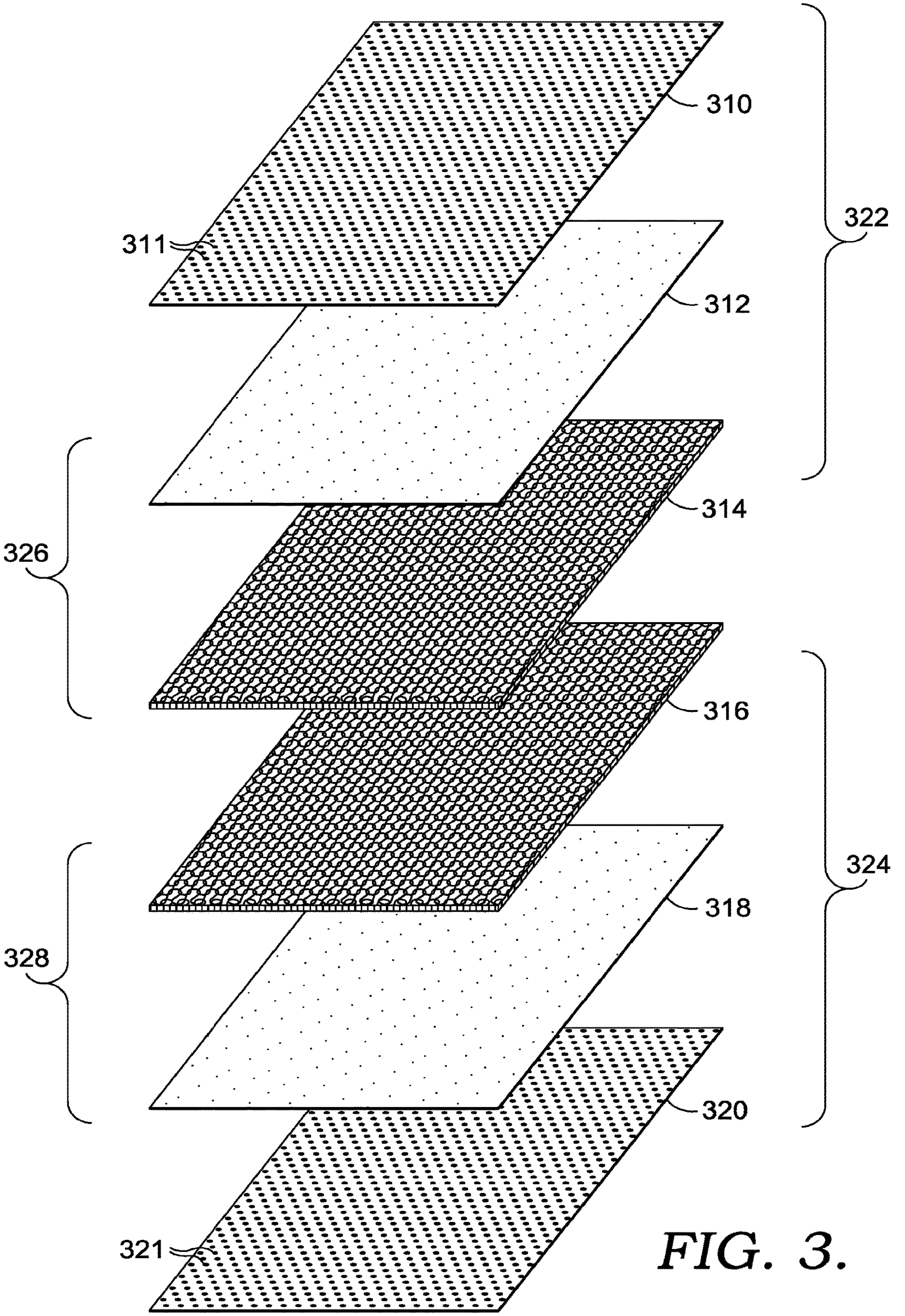
FIG. 3 illustrates an example number of layers used to form the ventilating and filtrating face mask of FIG. 1 in accordance with aspects herein.

In example aspects, the face mask 100 may include multiple stacked layers as shown in FIG. 3 which depicts the different layers and their relationship to each other. The multiple stacked layers may include first knit layer 310, first polyurethane (PU) layer 312, second knit layer 314, third knit layer 316, second PU layer 318, and fourth knit layer 320. In further example aspects, the layers 310, 312, 314, 316, 318, and 320 may be arranged in two laminate constructions such as first laminate construction 322 composed of the layers 310, 312, and 314 and second laminate construction 324 composed of the layers 316, 318, and 320.

In example aspects, the first knit layer 310 forms an outermost-facing surface of the face mask 100. The first knit layer 310 may be formed of a mesh knit material with holes 311. The first knit layer 310 may be formed from, for example, polyester and/or nylon yarns. The use of a mesh knit material with the holes 311 contributes to the breathability and permeability of the face mask 100. Use of polyester and/or nylon yarns with their low moisture regain, may contribute to movement of moisture through the first knit layer 310 by way of, for example, capillary action between the yarns and/or the fibers/filaments forming the yarns.

The first PU layer 312 may be formed of a PU material such as, for example, an open-cell PU foam or a thermoplastic PU material. The PU material may act as a filter of particulate matter in some example aspects as well as having a melting or softening temperature that allows it to soften and be molded during a molding process. Use of an open-cell PU foam facilitates the movement of air and/or moisture vapor through the PU foam which contributes to the overall permeability and breathability of the face mask 100.

The second knit layer 314 may be formed of a knit spacer material that is able to filter particulate matter while still allowing for air flow. In addition, the second knit layer 314 may be formed from, for example, nylon and/or polyester yarns which help to move moisture through the second knit layer 314 by way of capillary action. In example aspects, the second knit layer 314 in combination with the first PU layer 312 may form a first filtration layer 326 effective to filter particulate matter while still allowing air to move through the layers 312 and 314. In example aspects, the second knit layer 314 may also be heat set during the molding process which contributes to the overall structural stability of the face mask 100.

The use of the materials described to form the first knit layer 310, the first PU layer 312, and the second knit layer 314 provides a good balance of a soft hand feel, a nice aesthetic on the outermost-facing surface of the face mask 100, the needed rigidity to maintain the molded shape of the face mask 100 during use and wash, and the desired filtration properties. For example, use of a mesh-foam-mesh construction would likely not have enough rigidity after molding to maintain the shape of the face mask 100 during use and wash; it also may not provide the needed filtration efficacy. Use of a spacer-foam-spacer construction would likely provide the needed rigidity and filtration efficacy but the construction may lack a soft hand feel and may be uncomfortable to wear depending on the properties of the knit spacer material.

The third knit layer 316 may also be formed of a knit spacer material that is able to filter particulate matter while still allowing for air flow. The third knit layer 316 may also help move moisture through the third knit layer 316 by way of capillary action. In example aspects, the knit spacer material used to form the third knit layer 316 may be the same knit spacer material used to form the second knit layer 314. It is also contemplated herein, that different knit spacer materials may be used to form the second knit layer 314 and the third knit layer 316. In example aspects, the third knit layer 316 is not affixed to the second knit layer 314 except for securement at or adjacent to the continuous edge 110 of the face mask 100. Similar to the second knit layer 314, the third knit layer 316 may be heat set during the molding process contributing the overall structural stability of the face mask 100.

Like the first PU layer 312, the second PU layer 318 may be formed of a PU material such as, for example, an open-cell PU foam or a thermoplastic PU material that is effective to filter particulate matter. The second PU layer 318 may be formed of the same material as the first PU layer 312 in example aspects. It is also contemplated herein that the second PU layer 318 may be formed of a different material than the first PU layer 312. The PU material used to form the second PU layer 318 may have a melting or softening temperature that allows it to soften and be molded during a molding process. In example aspects, the third knit layer 316 in combination with the second PU layer 318 may form a second filtration layer 328 effective to filter particulate matter while still allowing air to move through the layers 316 and 318. The first filtration layer 326 in combination with the second filtration layer 328 may be effective to filter particles of 2.5 microns or less with up to at least 90% efficiency. The first filtration layer 326 in combination with the second filtration layer 328 may also be effective to filter smaller-sized particle including those that are 0.3 microns or less.

The fourth knit layer 320 forms an innermost-facing surface of the face mask 100 and may be formed of a mesh knit material with holes 321. The mesh knit material used to form the fourth knit layer 320 may be the same material used to form the first knit layer 310 in example aspects. It is also contemplated herein that a different mesh knit material may be used to form the fourth knit layer 320 than the mesh knit material used to form the first knit layer 310. The use of a mesh knit material to form the fourth knit layer 320 provides a comfortable and breathable layer next to the wearer's skin. As well, the fourth knit layer 320 may be formed using polyester and/or nylon yarns, which helps to move moisture away from the wearer's face and toward the first knit layer 310. Similar to the first laminate construction 322, selections of the materials used to form the third knit layer 316, the second PU layer 318, and the fourth knit layer 320 provides a good balance of a soft hand feel to the innermost-facing surface of the face mask 100, the needed rigidity to maintain the molded shape of the face mask 100 during use and wash, and the desired filtration properties.

Figure 4:
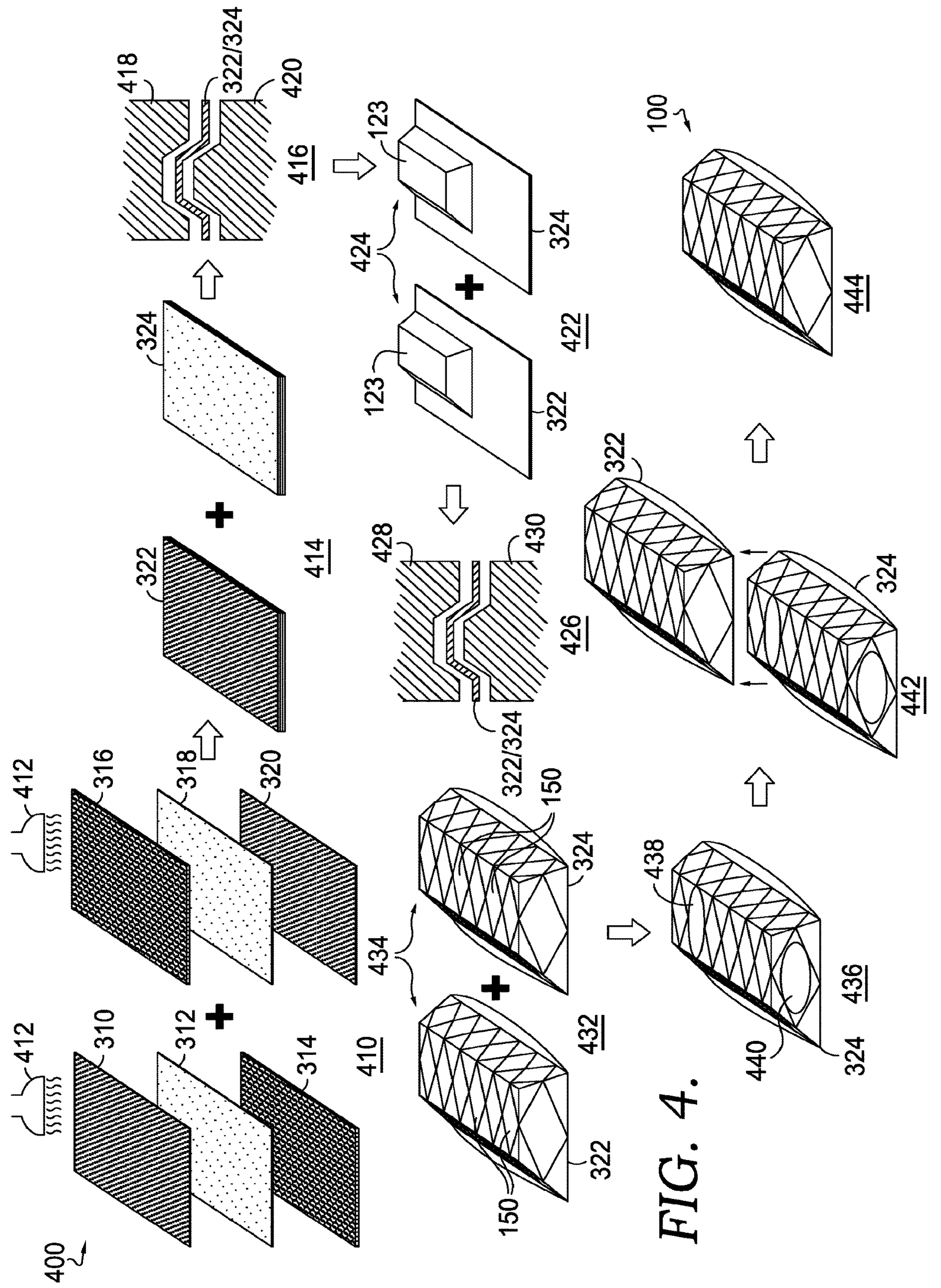
FIG. 4 illustrates a schematic of an example method of manufacturing the ventilating and filtrating face mask of FIG. 1 in accordance with aspects herein.

FIG. 4 illustrates a schematic of an example method of manufacturing the face mask 100 and is referenced generally by the numeral 400. At step 410, the first laminate construction 322 is formed by layering the first knit layer 310, the first PU layer 312, and the second knit layer 314 in a stacked configuration such that surfaces of the respective layers are positioned adjacent to each other and the first PU layer 312 is positioned between the first knit layer 310 and the second knit layer 314. In example aspects, an adhesive, such as polyurethane (PUR) thermoplastic adhesive may be applied to the different layers 310, 312, and/or 314. The stacked layers 310, 312, and 314 are then subject to a process to laminate or adhere the layers 310, 312, and 314 together. For example, a heat and/or pressure process, indicated by reference numeral 412 may be used to adhere the layers 310, 312, and 314 together to form the first laminate construction 322. Similarly, at the step 410 the second laminate construction 324 is formed by layering the third knit layer 316, the second PU layer 318, and the fourth knit layer 320 in a stacked configuration such that surfaces of the respective layers are positioned adjacent to each other and the second PU layer 318 is positioned between the third knit layer 316 and the fourth knit layer 320. The PUR adhesive may be applied to the layers 316, 318, and/or 320. The stacked layers 316, 318, and 320 are then subject to a process to laminate or adhere the layers 316, 318, and 320 together. For example, a heat and/or pressure process, indicated by reference numeral 412 may be used to adhere the layers 316, 318, and 320 together to form the second laminate construction 324.

Step 414 depicts the first laminate construction 322 and the second laminate construction 324 after the respective layers 310, 312, and 314 have been laminated together and the layers 316, 318, and 320 have been laminated together. At step 416, each of the first laminate construction 322 and the second laminate construction 324 are molded to form a first shape using a female mold plate 418 and a male mold plate 420. The molding step 416 may use heat (e.g., about 180 Celsius) and/or pressure to soften the first PU layer 312 and the second PU layer 318 and mold the layers 312 and 318 to the first shape. The heat and/or pressure may also heat set the knit layers including the first knit layer 310, the second knit layer 314, the third knit layer 316, and the fourth knit layer 320.

Step 422 illustrates the first laminate construction 322 and the second laminate construction 324 after the molding step 416 where each of the first laminate construction 322 and the second laminate construction 324 are molded into the first shape as referenced by numeral 424. As shown, the first shape 424 includes the mid-region 123 without the pleats 150. Thus, the offset form of the mid-region 123 is created based on the molding step 416.

Step 426 depicts a second molding process using a female mold plate 428 and a male mold plate 430 where each of the first laminate construction 322 and the second laminate construction 324 are molded to form a second shape. The molding step 426 may use heat (e.g., about 180 Celsius) and/or pressure to soften the first PU layer 312 and the second PU layer 318 and mold the layers 312 and 318 to the second shape. The heat and/or pressure may also heat set the knit layers including the first knit layer 310, the second knit layer 314, the third knit layer 316, and the fourth knit layer 320. In example aspects, a two-step molding process is used to reduce stress on the different knit layers used to form the face mask 100.

Step 432 illustrates the first laminate construction 322 and the second laminate construction 324 after the molding step 426 where each of the first laminate construction 322 and the second laminate construction 324 are molded into the second shape as referenced by numeral 434. As shown, the second shape 434 includes the pleats 150. The depiction of the pleats 150 in FIG. 4 is illustrative only and it is contemplated herein that the pleats 150 may have the configuration shown in FIGS. 1 and 2 and/or other configurations.

Step 436 illustrates an optional step in which a hole 438 and a hole 440 are formed in the second laminate construction 324. In example aspects, the holes 438 and 440 may extend through all three layers 316, 318, and 320. In other example aspects, the holes 438 and 440 may extend through the layers 316 and 318 leaving the fourth knit layer 320 intact. When formed into the face mask 100, the hole 438 would be positioned above the nostrils of the wearer and over the dorsum of the wearer's nose. The hole 440 would be positioned at the chin area of the wearer. Removing material layers in these locations facilitates facial movement without causing significant shifting of the face mask 100. Although not depicted, step 436 may also include securing the nose bridge 124 to the second knit layer 314.

At step 442, the second laminate construction 324 is joined to the first laminate construction 322 such that a surface of the third knit layer 316 is positioned adjacent to a surface of the second knit layer 314 and the pleats of the second laminate construction 324 are registered or aligned with the pleats of the first laminate construction 322. Step 442 may also include affixing together the first laminate construction 322 and the second laminate construction 324 at the perimeter edges of each using, for example, stitching or bonding. Additionally, although not shown, the step 442 may include positioning the fourth knit layer 320 or a similar mesh knit layer over the holes 438 and 440 such that the entire inner-facing surface of the face mask 100 includes the fourth knit layer 320 or the similar mesh knit layer. Step 442 may also include positioning a thin foam material (about 3 mm) in the hole 438 and covering the foam material with the fourth knit layer 320 or the similar mesh knit layer. The thin foam material may provide cushioning, and, in example aspects, the foam material may be thinner than the second PU layer 318 to help reduce the thickness of the face mask 100 in this area. Step 444 illustrates the face-covering portion of the face mask 100. The method 400 may include additional steps such as trimming excess material from the first and second laminate constructions 322 and 324, applying the gasket 122 around the continuous edge 110 of the face mask 100, and/or adding an attachment mechanism, such as the attachment mechanism 120 to the face mask 100.

Figure 5:
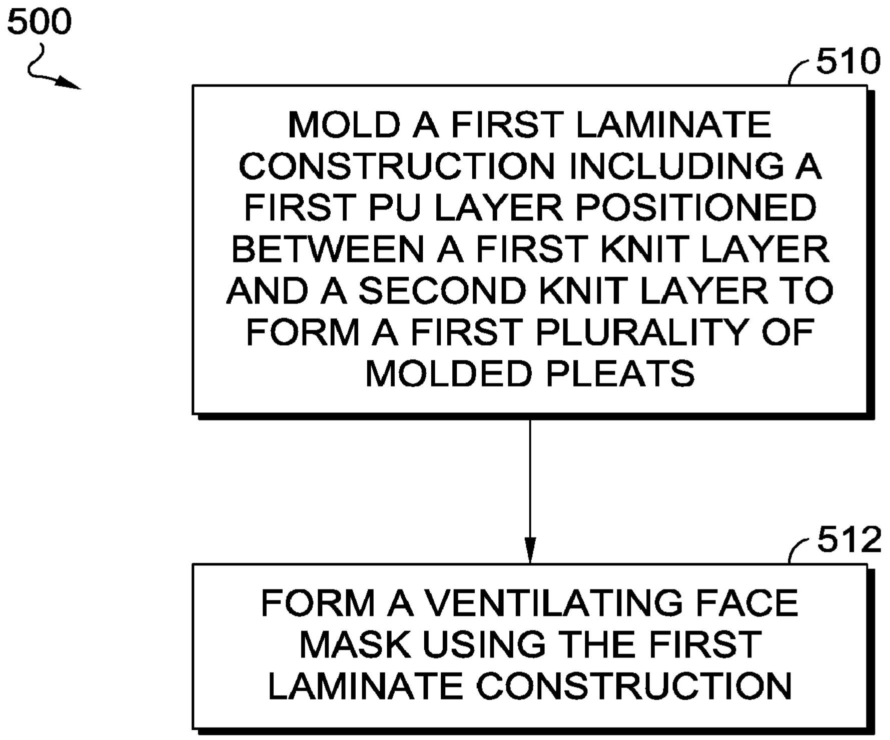
FIG. 5 illustrates a flow diagram of an example method of manufacturing the ventilating and filtrating face mask of FIG. 1 in accordance with aspects herein.

FIG. 5 depicts a flow diagram of an example method 500 of manufacturing a ventilating and filtrating face mask such as the face mask 100 described herein. At a step 510, a first laminate construction, such as the first laminate construction 322 is molded to form a first plurality of molded pleats such as the pleats 150. At a step 512, the face mask is formed using at least the molded first laminate construction. When the face mask is formed, the first plurality of pleats extend from a left side edge to a right side edge of the face mask.

The method 500 may include additional steps such as molding a second laminate construction, such as the second laminate construction 324 to form a second plurality of molded pleats, such as the molded pleats 150 and joining the first laminate construction and the second laminate construction so that a third knit layer, such as the third knit layer 316 of the second laminate construction 324 is positioned adjacent to a second knit layer, such as the second knit layer 314 of the first laminate construction 322 and the second plurality of pleats are in registration with the first plurality of pleats. In example aspects, the method 500 of forming the face mask may not include any use of nonwoven materials.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described

What is claimed is:

1. A rigid and washable ventilating face mask comprising:

a first laminate construction including a first polyurethane (PU) layer positioned between a first knit layer and a second knit layer, the first knit layer forming an outermost-facing surface of the rigid and washable ventilating face mask;

a second laminate construction including a second PU layer positioned between a third knit layer and a fourth knit layer, the third knit layer adjacent to the second knit layer, at least a portion of the fourth knit layer forming an innermost-facing surface of the rigid and washable ventilating face mask; and a molded shape comprising:

a right planar portion;

a middle planar portion;

a left planar portion; and a plurality of molded pleats formed from the first laminate construction and the second laminate construction, the plurality of molded pleats extending continuously from a left side edge to a right side edge of the rigid and washable ventilating face mask, wherein the plurality of molded pleats are heat-set such that the rigid and washable ventilating face mask has structural stability to prevent a collapse of a mid-region of the rigid and washable ventilating face mask against a wearer's nose and mouth when the rigid and washable ventilating face mask is in use.

2. The rigid and washable ventilating face mask of claim 1, wherein the third knit layer is substantially unaffixed from the second knit layer.

3. The rigid and washable ventilating face mask of claim 1, wherein the first knit layer and the fourth knit layer are mesh knit layers.

4. The rigid and washable ventilating face mask of claim 1, wherein the second knit layer and the third knit layer are spacer knit layers.

5. The rigid and washable ventilating face mask of claim 1, wherein the first PU layer and the second PU layer include one of an open-cell PU foam or a thermoplastic polyurethane.

6. The rigid and washable ventilating face mask of claim 1, further comprising an attachment mechanism adapted to secure the rigid and washable ventilating face mask to a face of a wearer.

7. The rigid and washable ventilating face mask of claim 1, wherein the third knit layer and the second PU layer are absent from one or more areas of the rigid and washable ventilating face mask.

8. A method of manufacturing the rigid and washable ventilating face mask of claim 1, the method comprising:

molding the first laminate construction including the first polyurethane (PU) layer positioned between the first knit layer and the second knit layer to heat-set and form the right planar portion, the middle planar portion, and the left planar portion; and forming the rigid and washable ventilating face mask using the first laminate construction.

9. The method of manufacturing the rigid and washable ventilating face mask of claim 8, further comprising:

molding the second laminate construction including the second PU layer positioned between the third knit layer and the fourth knit layer; and joining the first laminate construction and the second laminate construction such that the third knit layer is adjacent to the second knit layer and such that a first plurality of molded pleats of the first laminate construction are in registration with a second plurality of molded pleats of the second laminate construction to form the plurality of molded pleats, wherein the first knit layer forms an outermost-facing surface of the rigid and washable ventilating face mask and the fourth knit layer forms an innermost-facing surface of the rigid and washable ventilating face mask.

10. The method of manufacturing the rigid and washable ventilating face mask of claim 9, wherein joining the first laminate construction and the second laminate construction includes affixing together a perimeter edge of the first laminate construction and a perimeter edge of the second laminate construction, wherein the middle planar portion is configured to extend at an angle θ from a line extending orthogonal to an axis extending through an apex area of the middle planar portion.

11. The method of manufacturing the rigid and washable ventilating face mask of claim 9, further comprising:

removing a portion of the second PU layer and the third knit layer at a first area of the rigid and washable ventilating face mask corresponding to an area above a nostril area of a wearer; and removing a portion of the second PU layer and the third knit layer at a second area of the rigid and washable ventilating face mask corresponding to a chin area of the wearer.

12. The method of manufacturing the rigid and washable ventilating face mask of claim 8, further comprising affixing an attachment mechanism to the rigid and washable ventilating face mask, wherein the attachment mechanism is adapted to secure the rigid and washable ventilating face mask to a face of a wearer.

13. The method of manufacturing the rigid and washable ventilating face mask of claim 8, wherein the rigid and washable ventilating face mask does not include a nonwoven material.

* * * * *